US 9,998,995 B2

United States Patent
Chongoushian

(10) Patent No.: US 9,998,995 B2
(45) Date of Patent: Jun. 12, 2018

(54) ADAPTIVE POWER CONTROL OF LOCALIZED SUBNETS FOR REDUCING SELF-INTERFERENCE IN WIRELESS NETWORKS

(71) Applicant: BAE SYSTEMS INFORMATION AND ELECTRONIC SYSTEMS INTEGRATION INC., Nashua, NH (US)

(72) Inventor: John H Chongoushian, Emerson, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 86 days.

(21) Appl. No.: 15/272,700

(22) Filed: Sep. 22, 2016

(65) Prior Publication Data

US 2018/0084498 A1 Mar. 22, 2018

(51) Int. Cl.
*H04W 52/02* (2009.01)
*H04W 84/18* (2009.01)
*H04W 28/04* (2009.01)

(52) U.S. Cl.
CPC ..... *H04W 52/0229* (2013.01); *H04W 28/048* (2013.01); *H04W 84/18* (2013.01)

(58) Field of Classification Search
None
See application file for complete search history.

(56) References Cited

U.S. PATENT DOCUMENTS

| 6,353,729 | B1 | 3/2002 | Bassirat |
| 6,779,009 | B1 | 8/2004 | Zuber |
| 7,020,701 | B1 | 3/2006 | Gelvin et al. |
| 7,308,005 | B1 | 12/2007 | Roggendorf |
| 7,313,143 | B1 | 12/2007 | Bruno |
| 7,813,695 | B2 | 10/2010 | Haartsen |
| 8,032,032 | B2 | 10/2011 | Chand et al. |
| 8,995,902 | B2 | 3/2015 | Reiss |

(Continued)

OTHER PUBLICATIONS

Northrup Grumman Corporation, Understanding Voice and Data Link Networking, Dec. 2014, Guidebook, Distributed by Northrup Grumman, 9326 Spectrum Center Blvd, San Diego, CA 92123-1433, Document No. 135-02-005, 320 pages.

(Continued)

*Primary Examiner* — Hong Cho
(74) *Attorney, Agent, or Firm* — Maine Cernota & Rardin

(57) ABSTRACT

A method for reducing self-interference in a wireless network, such as a Link 16 network, while maintaining simultaneous multiple access takes advantage of the physical proximity of nodes in a localized subnetwork, such as a fighter-to-fighter subnetwork in a flight wing, by actively reducing the transmit powers used for subnet messages between the nodes. Calibration messages such as Precise Participant Location and Identification (PPLI) messages are exchanged between all of the nodes of the localized subnetwork, from which each node determines the identities, transmit powers, noise levels, and SNRs of all of the other nodes. The node then determines a link margin for other nodes, and sets its transmit power to a "safe" level for the subnetwork according to the lowest link margin.

18 Claims, 4 Drawing Sheets

(56) References Cited

U.S. PATENT DOCUMENTS

| | | |
|---|---|---|
| 9,066,311 B1 | 6/2015 | Sherman |
| 9,250,312 B1 | 2/2016 | Knibbe |
| 9,451,558 B2 * | 9/2016 | Zhu .................... H04W 52/243 |
| 9,668,228 B2 * | 5/2017 | Kim .................... H04W 52/383 |
| 2003/0058959 A1 | 3/2003 | Rafie et al. |
| 2003/0101034 A1 | 5/2003 | Tillotson |
| 2004/0017824 A1 | 1/2004 | Koenck et al. |
| 2005/0030976 A1 * | 2/2005 | Wentink ............... H04B 7/2126 370/473 |
| 2005/0059422 A1 * | 3/2005 | Rudolf .................. H04L 41/00 455/522 |
| 2010/0007554 A1 | 1/2010 | Wang |
| 2010/0098036 A1 | 4/2010 | Li |
| 2011/0244786 A1 | 10/2011 | Fujii |
| 2016/0262151 A1 | 9/2016 | Chongoushian |

OTHER PUBLICATIONS

International Search Report, PCT/US17/52242, dated Nov. 29, 2017, 11 pages.

\* cited by examiner

ADAPTIVE POWER CONTROL OF LOCALIZED SUBNETS FOR REDUCING SELF-INTERFERENCE IN WIRELESS NETWORKS

FIELD OF THE DISCLOSURE

The following disclosure relates generally to secure wireless network communications, and more particularly to methods for reducing self-interference in wireless communication networks.

BACKGROUND

Wireless communication networks are often configured to provide a plurality of "multiple access" communication channels over which communications can be simultaneously transmitted. Often, the network is divided into a plurality of virtual "subnetworks," or "subnets," that transmit information over assigned communication "channels" within the network. Specific protocols are widely used to enable simultaneous multiple access, by separating the channels in time (e.g. Time Division Multiple Access, "TDMA"), in frequency (Frequency Division Multiple Access, "FDMA") and/or by orthogonal coding (Code Division Multiple Access, "CDMA"). Nevertheless, as the demand for simultaneous multiple access increases, network contention can increase, leading to self-interference within the network.

An example is the Link 16 networking system. Link 16 is a widespread tactical wireless networking system that is used by front line land, air, and naval systems in the United States, NATO, and allied nations to allow multiple users to share situational awareness data. In particular, Link 16 is a wireless protocol based on a TDMA omnidirectional waveform which also employs FDMA and CDMA. Messages transmitted on Link 16 networks are grouped in functional areas, and allocated to "Network Participation Groups" (NPGs), also sometimes referred to simply as Participation Groups (PGs), which function as virtual networks that are distinguished according to the specific functions and purposes of the messages that they carry (e.g. network management).

According to the TDMA protocol, information is transmitted on a Link 16 network in timeslots that repeat every TDMA frame, or "epoch." The total number of timeslots included in a Link 16 network can be divided into subsets that represent virtual subnetworks, also referred to as "subnets." Each subnet is distinguished according to the subset of the Link 16 time slots that belongs to the subnet, as well as by the participants that share the subset of time slots. Link 16 subnets are also differentiated by their frequency-hopping patterns. Multiple subnets in a network can be "stacked" or "multinetted" by allowing time slots to be used redundantly, with the data transmitted in each net on different frequencies (FDMA) and possibly also with different coding (CDMA). Each subnet of a Link 16 network is assigned a "net number" that designates its timeslots and particular hopping pattern.

A typical link 16 network is shown in FIG. 1A. The blocks 10 in the ring 12 are time slots. Each participant 14 is provided transmit, receive, and relay time slot assignments by a network planner (not shown) prior to start of a mission. The column 16 to the right of the ring 12 illustrates the ability for Link 16 to operate on multiple nets (shown as stacked rings in the column 16). Each of the rings in the column 16 can be replaced, allowing users to form sub-networks or sub-nets allowing them to exchange data using different CDMA and FDMA codes to expand the capability of the network.

Each Link 16 participant terminal is initialized with a unique identifier, known as the Source Track Number (STN), along with time slot assignments that indicate which time slots are to be used for transmitting, receiving, and relaying. In addition to containing the starting time slot index and recurrence rate, each time slot assignment includes the NPG number for that time slot.

All Link 16 participants periodically exchange Precise Participant Location and Identification (PPLI) messages, which are generated by the terminal and provide identification, position, and status information to the Link 16 network. Details of the construction of these messages can be found in MIL-STD-6016.

With the advent of multiple message reception in a single time slot (known as Concurrent Multi-Netting (CMN) and Concurrent Contention receive (CCR)), participants in a Link 16 network are able to simultaneously receive messages from multiple transmitters in the same sub-network (CCR) as well as from transmitters in different subnetworks (CMN), thereby allowing increased use of stacked nets and subnetworks, including subnetworks that include only selected groups of nodes from the Link 16 network.

This increased use of stacked nets and subnetworks can lead to increased network contention, whereby a greater number of users transmit in the same timeslot. Although Link 16's FDMA and CDMA characteristics allow for multiple sub-networks to co-exist in close proximity, nevertheless as more participants are added to the network, self-interference can degrade the overall network performance.

What is needed, therefore, are methods for reducing self-interference in wireless network while maintaining and enhancing the ability for simultaneous multiple access.

SUMMARY

A method is disclosed for reducing self-interference caused by a localized subnetwork in a wireless network while maintaining and enhancing the ability for simultaneous multiple access. The disclosed method is based on a recognition that subnetworks, also referred to herein as "subnets," in a wireless network are often intended for communication between participants that are located physically close to each other, i.e. within a limited area or region. An example for a Link 16 network would be fighter-to-fighter communications in a flight wing. Accordingly, the disclosed method reduces self-interference by actively reducing the transmit power used for subnet messages between members of such a localized subnet.

According to the disclosed method, messages are exchanged between all of the members of the localized subnetwork, from which each node in the network determines the identities and transmit powers of all of the other nodes. Each participant in the localized subnetwork then proceeds to determine a safe broadcasting power level for the subnetwork based on link margins calculated for all of the other members, and actively controls its transmit power accordingly.

The localized subnetwork thereby maintains reliable intercommunication, while at the same time reducing self-interference within the network as a whole.

A first general aspect of the present invention is a method for reducing self-interference by a localized subnetwork of a wireless communications network. The method includes receiving by a first node at least one calibrating message from one or more other nodes in the localized subnetwork, determining by the first node a transmit power and a link margin for the at least one received calibrating message, and adjusting by the first node of its transmit power to a level that will provide link margins for the other nodes in the subnetwork that are above a specified minimum, wherein the specified minimum is relative to the lowest of the link margins.

In embodiments, the transmit power for the calibrating message is predefined and thereby known to the first node. In any preceding embodiment, the transmit power for the calibrating message can be included as data in the message. In any preceding embodiment, the calibration signal can include a noise floor level of at least one of the other nodes in the localized subnetwork.

Any of the preceding embodiments can further include determining from the calibration message identities of the other nodes in the localized subnetwork. In any of the preceding embodiments determining the link margin can include correcting for sampling errors by determining a corrected, "true" correlation score for the received calibration message.

In any of the preceding embodiments determining the link margin can further include determining a signal-to-noise ratio for the received calibration messages. And in some of these embodiments time division multiple access (TDMA) is implemented in the wireless network, and determining the link margin further includes averaging the signal-to-noise ratio for the received calibration message over at least one TDMA frame.

Any of the preceding embodiments can further include determining a time of arrival "slant range" for the received calibration message.

Any of the preceding embodiments can further include the other nodes adjusting their transmit powers to levels that are greater by a designated safe offset amount than a minimum operational signal-to-noise level of the localized subnetwork node that has the lowest link margin. In some of these embodiments, the safe offset amount is programmable in 1 dB steps.

In any of the preceding embodiments the network can be a Link 16 network. In some of these embodiments, the calibration messages are Precise Participant Location and Identification (PPLI) messages. In any of these embodiments calculating the link margin can include determining a corrected, "true" peak correlation score (PCS) for each of the received PPLI messages according to the formula $$PCS = \left(1 - \left(\frac{\Delta}{400}\right) \times \cos\left(\frac{\pi\Delta}{400}\right) + \frac{1}{\pi}\sin\left(\frac{\pi\Delta}{400}\right)\right)$$

$\Delta$ being calculated according to the equation $$\Delta = 100 * (\sqrt{A} - \sqrt{B})/(\sqrt{C} - \sqrt{B})$$

where C is a measured peak preamble correlation score, A is a largest of values adjacent to the peak preamble score, and B is a smallest of the adjacent values.

Any of these embodiments can further include determining from the received calibration message a list of net numbers assigned for selected Network Participation Groups (NPGs) in the Link 16 network. And in any of these embodiments the transmit power of the received calibration message can be assumed to be a power level used by Link 16 Terminals.

Any of the preceding embodiments can further include periodically repeating the steps of the method.

A second general aspect of the present invention is non-transitory media containing software operable on a node in a localized subnetwork of a wireless communications network so as to reduce self-interference in the network. The software is configured to cause a first node in the localized subnetwork to receive at least one calibrating message from at least one other node in the localized subnetwork, determine a transmit power and a link margin for the at least one received calibrating message, and according to the lowest of the link margins, adjust its transmit power for the subnetwork to a level that will provide link margins for the other nodes in the subnetwork that are above a specified minimum, wherein the specified minimum is relative to the lowest of the determined link margins.

Implementations of the techniques discussed above may include a method or process, a system or apparatus, a kit, or a computer software stored on a computer-accessible medium. The details or one or more implementations are set forth in the accompanying drawings and the description below. Other features will be apparent from the description and drawings, and form the claims.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

This disclosure relates to a method for reducing self-interference in a wireless network while maintaining and enhancing the ability for simultaneous multiple access. The disclosed method is based on a recognition that subnets are often intended for communication between participants that are located physically close to each other, i.e. within a limited area or region, as is often the case for example for fighter-to-fighter communications in a flight wing. Subnetworks of this type are referred to herein as "localized" subnets. Accordingly, the disclosed method reduces self-interference by actively reducing the transmit power used for subnet messages between members of a localized subnet.

Note that MIDS and MIDS-JTRS terminals have the capability to alter their transmit power in three steps with a dynamic range in one example of about 23 dB (1 W to 200 W). These terminals also have the capability to alter their output power mode on a slot-by-slot basis.

According to the disclosed method, each participant in a localized subnetwork determines a safe broadcasting power level for the localized subnetwork based on link margins calculated for all of the other members, and actively controls its transmit power accordingly. In some embodiments, a "safe" broadcasting power is assumed to be at least 6 dB above the sensitivity level for the node of the localized subnetwork that has the lowest link margin. In other embodiments, the "safe" broadcasting power threshold is assumed to be at least 3 dB, and in still other embodiments it is assumed to be at least 1 dB.

Figure 1A:
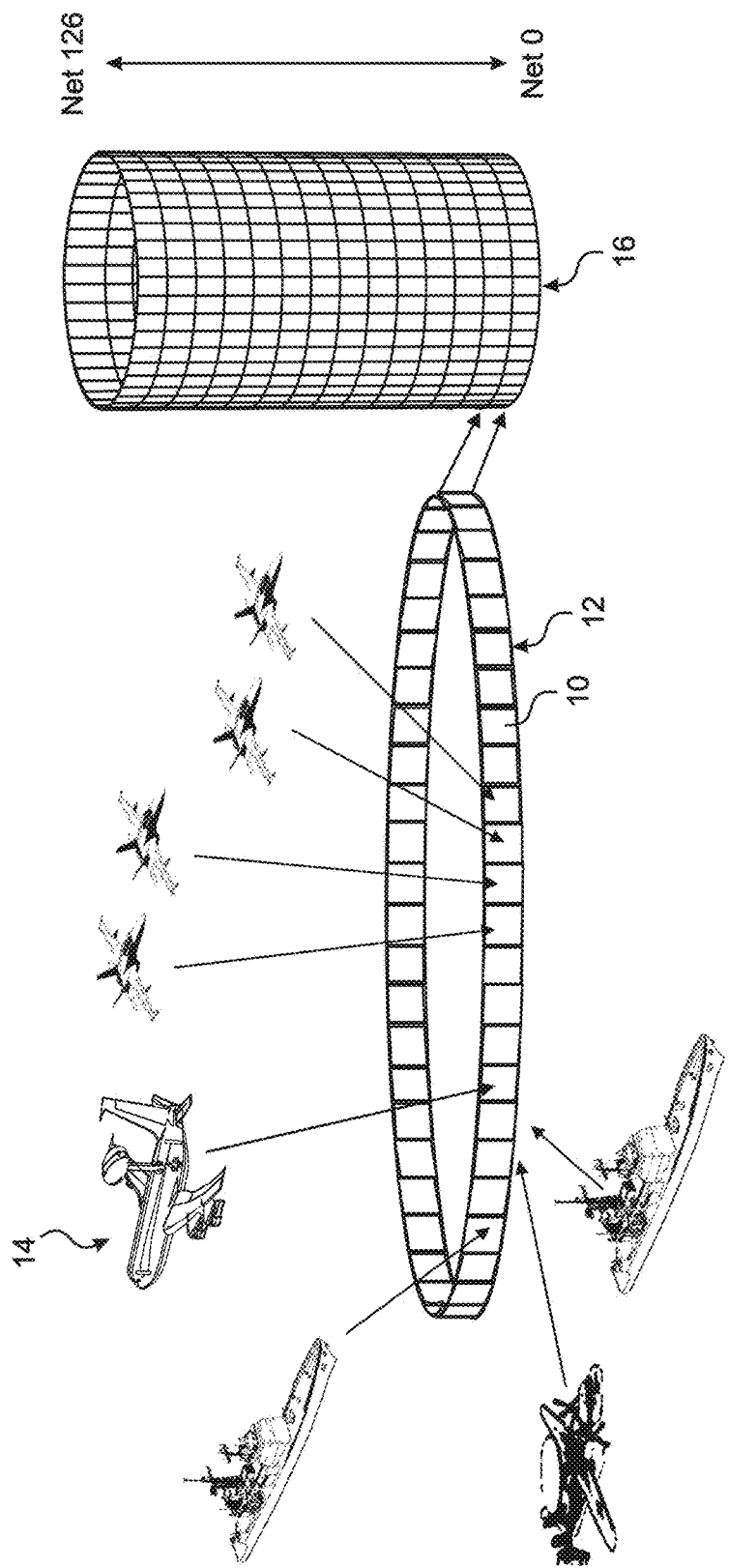
FIG. 1A is a graphical illustration of a typical Link 16 network architecture of the prior art.

Embodiments of the present invention are applicable to various multi-user/multi-signal networks such as a Link 16 network. With reference to FIG. 1A, in some of these embodiments, each Link 16 terminal in a localized subnetwork determines and stores the following information based on PPLI messages received from all of the other nodes in the localized subnetwork:

Identification of the Source Track Number (STN) for each node in the localized subnetwork 100;

Peak preamble correlation score for each node in the localized subnetwork 102;

Output power level of each node in the localized subnetwork 104;

For each node in the localized subnetwork, a list of net numbers assigned for selected Network Participation Groups (NPGs), for example some or all of the non-C2 NPGs, where "C2" refers to "command and control" 106;

"Slant range" (where "slant range" refers to the line of sight distance between two nodes, also known as the time of arrival) for each node in the subnetwork 108; and Ambient noise and signal to noise ratio for each node in the subnetwork 110.

In some of these embodiments, the information is periodically updated, and the transmit power levels are periodically adjusted. In embodiments, it is assumed that the link loss for each node in the localized subnetwork is the same in both directions.

In embodiments, each node provides its transmit power level in its broadcast message. This allows terminals transmitting with different power levels to interact with each other.

In various embodiments, each node measures the noise floor at the antenna and provides the noise level above the Standard Reference Level (SRL) to each of the other nodes, where the Standard Reference Level (SRL) is defined as the nominal receiver noise floor for the system. In some of these embodiments, in the event that a receiving nodes is in a noisier environment than transmitter transmitting node, the transmitting node increases its transmit power level to overcome the receiving node's ambient noise level.

Figure 1B:
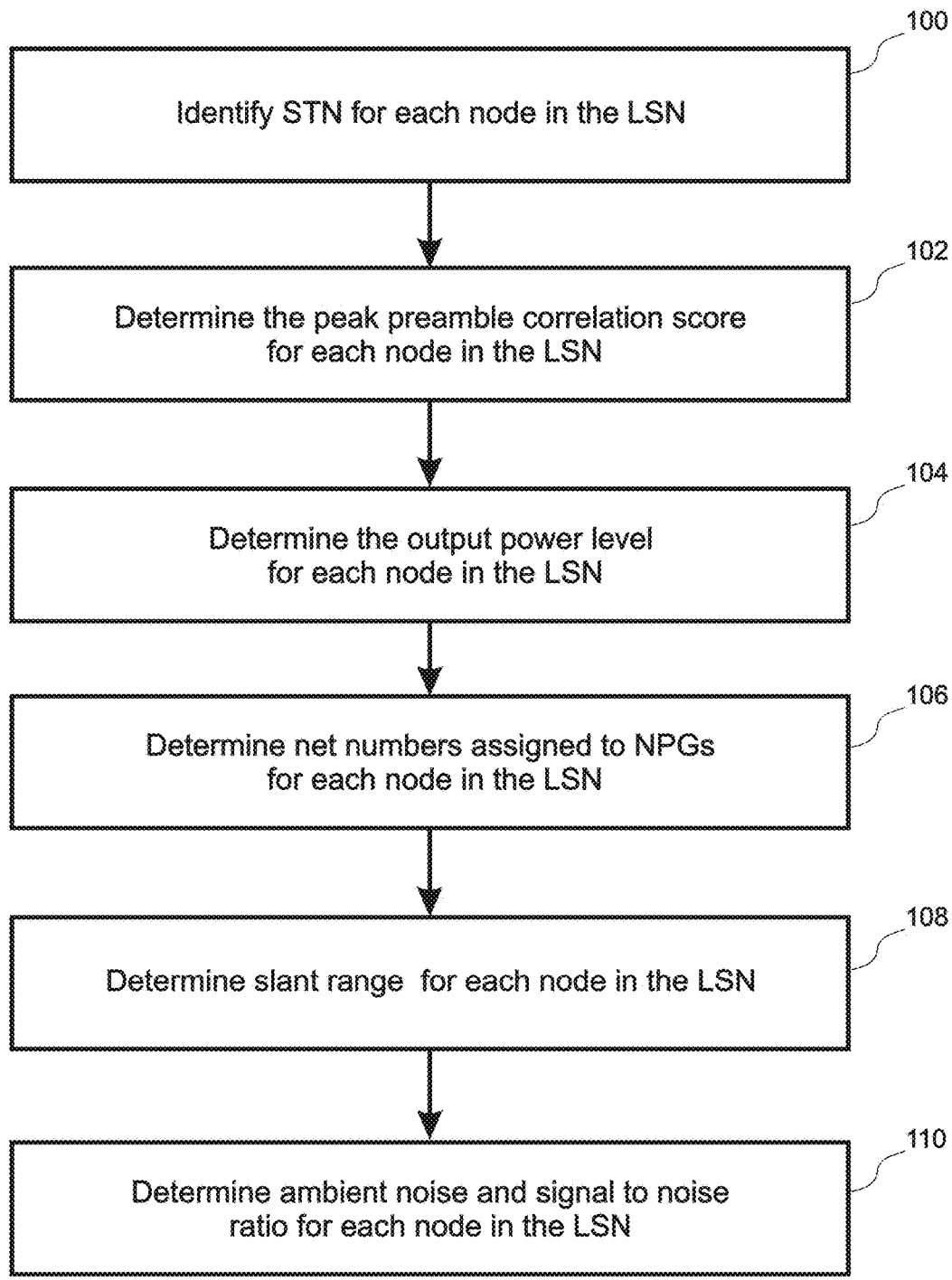
FIG. 1B is a flow diagram indicating information that is derived from received PPLI messages in an embodiment of the disclosed method.
Figure 1C:
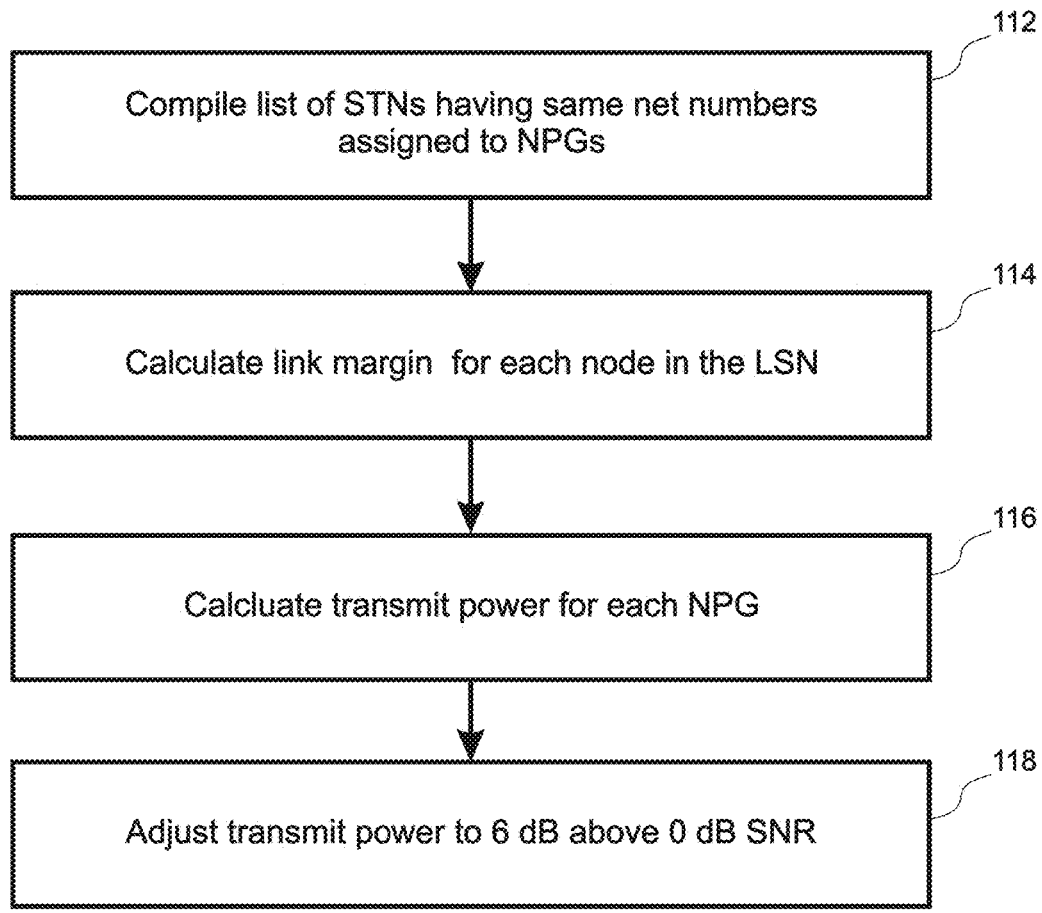
FIG. 1C is a flow diagram indicating steps included in an embodiment of the disclosed method.

With reference to FIG. 1B, once this information has been received and stored, in embodiments each member of the localized Link 16 subnetwork completes the following steps:

Compiling a list of STN's that have the same net numbers assigned to the selected NPGs 112;

Calculating a link margin for each node in the localized subnet from which a PPLI was received (assuming transmission at 200 W) 114;

Calculating a transmit power for the localized subnet for each of the selected NPGs 116; and Adjusting its transmit power level to a "safe" value such as at least 6 dB above the 0 dB signal to noise ratio 118.

Link 16 terminals determine if a message is available for reception by detecting if a message preamble is present. The Link 16 preamble consists of a series of pulses transmitted on pseudo-random frequencies, with each pulse having PN code which is known by the receiving terminal. The expected PN codes are fed into a "correlator" which is used to determine if a message is present. The Link 16 correlator samples the signal at the same rate as the chip length (200 nanoseconds). Depending on the timing of the input signal and internal clock, there may be a sampling error of the true correlation peak of up to 100 nanoseconds. Link 16 terminals determine this error Δ by determining the timing of the true peak using the adjacent "score" values from the correlator using Error! Reference source not found. below.

$$\Delta = 100 * (\sqrt{A} - \sqrt{B})/(\sqrt{C} - \sqrt{B}) \quad (eq.1)$$

where

C is the measured peak preamble correlation score;
A is the largest of the adjacent values; and
B is the smallest of the adjacent values.

Since the peak score is important to determining the link margin, Equation 2 below is used in embodiments to calculate the "true" peak correlation scores.

$$PCS = 1 - \left(\frac{\Delta}{400}\right) \times \cos\left(\frac{\pi\Delta}{400}\right) + \frac{1}{\pi}\sin\left(\frac{\pi\Delta}{400}\right) \quad (eq.\ 2)$$

Figure 2:
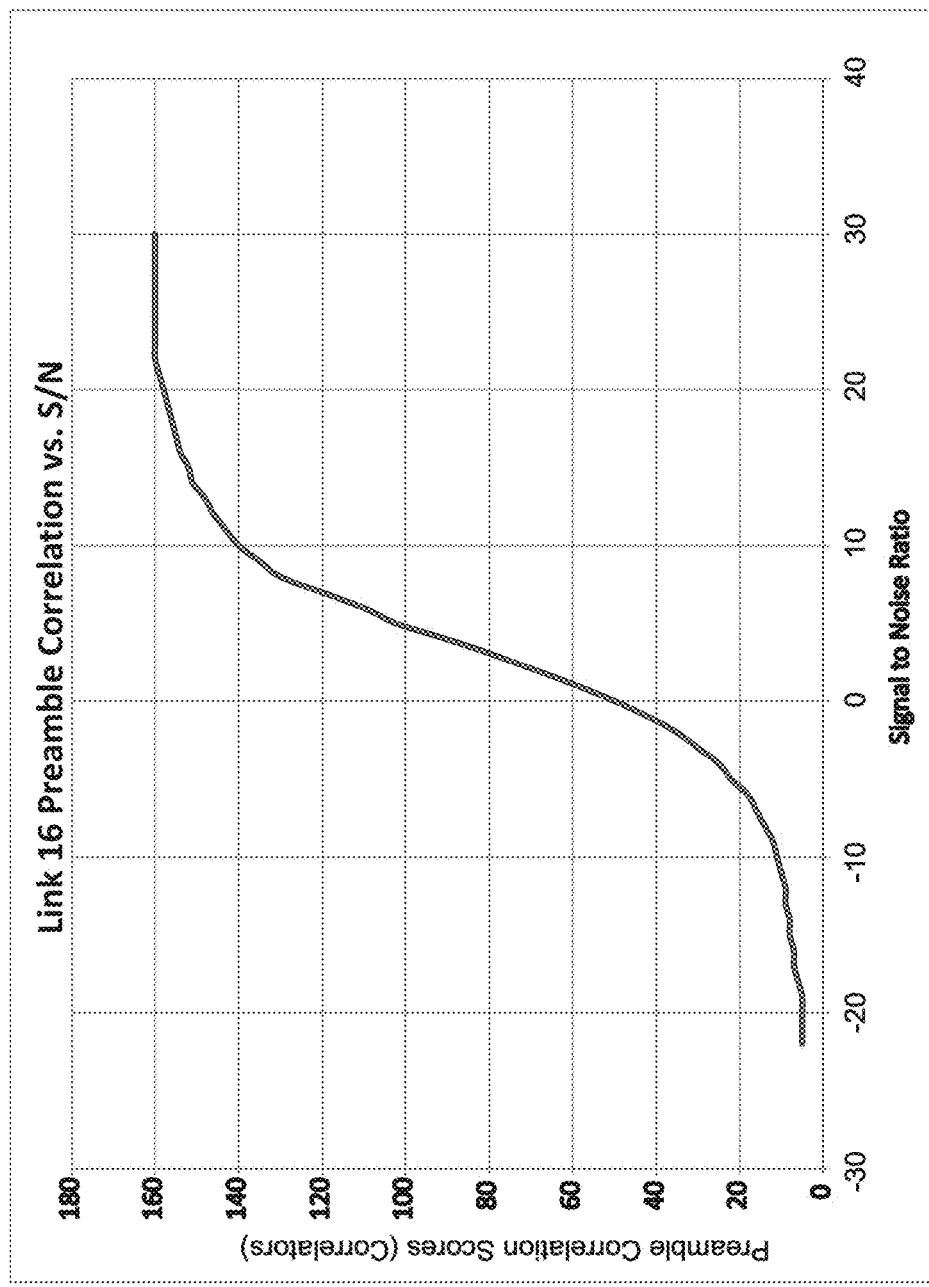
FIG. 2 is a graph that is used to determine signal-to-noise ratios from peak correlation scores in an embodiment of the disclosed method.

Accordingly, calculating the link margins in various embodiments includes:

calculating the true peak correlation scores using Equations 1 and 2;

determining the signal to noise ratio (SNR) for each PPLI received from a node in the localized subnet according to the graph presented in FIG. 2; and Averaging the correlation scores are averaged over an epoch.

In embodiments, by adjusting the transmit power levels of all of the nodes to a lowest possible "safe" value, the localized subnetwork thereby maintains reliable intercommunication, while at the same time reducing self-interference within the network as a whole. In some embodiments, a "safe" value is considered to be at least 6 dB above the 0 dB signal-to-noise ratio, where the 0 dB level is defined as the minimum signal to noise ratio that is required for operation. In other embodiments, a lesser level of noise is used and the "safe" value is considered to be at least 3 dB above the 0 dB signal to noise ratio. In various embodiments, the "safe" value can be programmed, for example in 1 dB steps.

In embodiments, the minimum transmit power can be calculated using the following equation:

$$Tx_{min} = TX_{L2} - (Corr_{S/N2-1} + SAFE) + N_{A2} - N_{A1}$$

where:

$TX_{L2}$—is the transmitted power level from the node (as reported e.g. by the node);

$Corr_{S/N2-1}$—is the signal to noise ratio of the received message (this is equal to the signal of the transmitting terminal plus the noise level of the receiving terminal ($N_{A1}$);

SAFE—is the value in dB above the system's minimum operational signal to noise level that will meet the system's communication message error rate requirements; and $N_{A2}$—is the ambient noise level of the intended receiving terminal.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

The invention illustratively disclosed herein suitably may be practiced in the absence of any element which is not specifically disclosed herein and is not inherently necessary. However, this specification is not intended to be exhaustive. Although the present application is shown in a limited number of forms, the scope of the invention is not limited to just these forms, but is amenable to various changes and modifications without departing from the spirit thereof. One or ordinary skill in the art should appreciate after learning the teachings related to the claimed subject matter contained in the foregoing description that many modifications and variations are possible in light of this disclosure. Accordingly, the claimed subject matter includes any combination of the above-described elements in all possible variations thereof, unless otherwise indicated herein or otherwise clearly contradicted by context. In particular, the limitations presented in dependent claims below can be combined with their corresponding independent claims in any number and in any order without departing from the scope of this disclosure, unless the dependent claims are logically incompatible with each other.

What is claimed is:

1. A method for reducing self-interference by a localized subnetwork of a wireless communications network, comprising a plurality of nodes in the localized subnetwork performing the following:
    a) receiving by a first node at least one calibrating message from one or more other nodes in the localized subnetwork;
    b) determining by the first node a transmit power and a link margin for the at least one received calibrating message; and
    c) adjusting by the first node of its transmit power to a level that will provide link margins for the other nodes in the subnetwork that are above a specified minimum, wherein the specified minimum is relative to the lowest of the link margins.

2. The method of claim 1, wherein the transmit power for the calibrating message is predefined and thereby known to the first node.

3. The method of claim 1, wherein the transmit power for the calibrating message is included as data in the message.

4. The method of claim 1, wherein the calibration signal includes a noise floor level of at least one of the other nodes in the localized subnetwork.

5. The method of claim 1, further comprising determining from the calibration message identities of the other nodes in the localized subnetwork.

6. The method of claim 1, wherein determining the link margin includes correcting for sampling errors by determining a corrected, "true" correlation score for the received calibration message.

7. The method of claim 1, wherein determining the link margin further includes determining a signal-to-noise ratio for the received calibration messages.

8. The method of claim 7, wherein time division multiple access (TDMA) is implemented in the wireless network, and determining the link margin further includes averaging the signal-to-noise ratio for the received calibration message over at least one TDMA frame.

9. The method of claim 1, further comprising determining a time of arrival "slant range" for the received calibration message.

10. The method of claim 1, further comprising the other nodes adjusting their transmit powers to levels that are greater by a designated safe offset amount than a minimum operational signal-to-noise level of the localized subnetwork node that has the lowest link margin.

11. The method of claim 10, wherein the safe offset amount is programmable in 1 dB steps.

12. The method of claim 1, wherein the network is a Link 16 network.

13. The method of claim 12, wherein the calibration messages are Precise Participant Location and Identification (PPLI) messages.

14. The method of claim 13, wherein calculating the link margin includes determining a corrected, "true" peak correlation score (PCS) for each of the received PPLI messages according to the formula $$PCS = \left(1 - \left(\frac{\Delta}{400}\right) \times \cos\left(\frac{\pi\Delta}{400}\right) + \frac{1}{\pi}\sin\left(\frac{\pi\Delta}{400}\right)\right)$$

$\Delta$ being calculated according to the equation $$\Delta = 100 * (\sqrt{A} - \sqrt{B})/(\sqrt{C} - \sqrt{B})$$

where C is a measured peak preamble correlation score, A is a largest of values adjacent to the peak preamble score, and B is a smallest of the adjacent values.

15. The method of claim 12, further comprising determining from the received calibration message a list of net numbers assigned for selected Network Participation Groups (NPGs) in the Link 16 network.

16. The method of claim 12, wherein the transmit power of the received calibration message is assumed to be a power level used by Link 16 Terminals.

17. The method of claim 1, further comprising periodically repeating steps a), b), and c).

18. Non-transitory media containing software operable on a node in a localized subnetwork of a wireless communications network so as to reduce self-interference in the network, the software being configured to cause a first node in the localized subnetwork to:
    receive at least one calibrating message from at least one other node in the localized subnetwork;
    determine a transmit power and a link margin for the at least one received calibrating message; and
    according to the lowest of the link margins, adjust its transmit power for the subnetwork to a level that will provide link margins for the other nodes in the subnetwork that are above a specified minimum, wherein the specified minimum is relative to the lowest of the determined link margins.

* * * * *